US011683282B2

(12) United States Patent
Pottier et al.

(10) Patent No.: US 11,683,282 B2
(45) Date of Patent: Jun. 20, 2023

(54) METHOD AND SYSTEM OF SYNCHRONIZING COMMUNICATIONS

(71) Applicant: MICROSOFT TECHNOLOGY LICENSING, LLC, Redmond, WA (US)

(72) Inventors: Marc Christopher Pottier, Seattle, WA (US); Vincent Bellet, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 937 days.

(21) Appl. No.: 16/542,020

(22) Filed: Aug. 15, 2019

(65) Prior Publication Data

US 2021/0051120 A1 Feb. 18, 2021

(51) Int. Cl.
*H04L 12/58* (2006.01)
*H04L 51/043* (2022.01)
(Continued)

(52) U.S. Cl.
CPC .......... *H04L 51/043* (2013.01); *H04L 51/222* (2022.05); *H04L 51/224* (2022.05); *H04L 67/54* (2022.05)

(58) Field of Classification Search
CPC ....... H04L 51/224; H04L 51/56; H04L 51/04; H04L 51/234; H04L 51/043;
(Continued)

(56) References Cited

U.S. PATENT DOCUMENTS 6,968,052 B2 11/2005 Wullert, II
7,225,226 B2 5/2007 Fitzpatrick et al.
(Continued)

FOREIGN PATENT DOCUMENTS

EP 2830263 A1 1/2015

OTHER PUBLICATIONS

"International Search Report and Written Opinion Issued in PCT Application No. PCT/US20/024362", dated May 25, 2020, 11 Pages.
(Continued)

*Primary Examiner* — Chirag R Patel

(74) *Attorney, Agent, or Firm* — NovoTechIP International PLLC

(57) ABSTRACT

A method of and system for synchronous communications between a sender and recipient(s) of a message containing a question include receiving over a network an indication that the message was sent from the sender to the recipients via a user interface of a first application or a first service and a response to the question was not received within a predetermined time, monitoring a digital location of the sender and the recipients, the digital location being an electronic application or service being currently utilized, determining whether the sender and at least one of the recipients are concurrently using a second application or a second service, and upon determining that the sender and at least one of the recipients are concurrently using the second application or the second service, sending a notification signal over the network to the sender or one of the one or more recipients to notify the sender or the recipient via a user interface element displayed on a client device that the sender and at least one of the recipients are available within the second application or the second service. The notification signal sent may include a reminder about the question.

20 Claims, 10 Drawing Sheets

(51) Int. Cl.
*H04L 51/222* (2022.01)
*H04L 51/224* (2022.01)
*H04L 67/54* (2022.01)

(58) Field of Classification Search
CPC .... G06F 16/3344; G06F 16/243; G06F 40/40; G06Q 10/10
See application file for complete search history.

(56) References Cited

U.S. PATENT DOCUMENTS

| | | | |
|---|---|---|---|
| 7,319,882 | B2 | 1/2008 | Mendiola et al. |
| 7,756,936 | B2 | 7/2010 | Rosenberg et al. |
| 7,933,226 | B2 | 4/2011 | Woodruff et al. |
| 8,122,363 | B1 * | 2/2012 | Appelman ............ G06Q 10/107 715/752 |
| 8,423,392 | B2 | 4/2013 | Moxley et al. |
| 8,560,567 | B2 | 10/2013 | Perez Del Carpio et al. |
| 9,306,820 | B2 * | 4/2016 | Boyer ................. H04L 61/4523 |
| 9,380,017 | B2 | 6/2016 | Gelfenbeyn et al. |
| 9,397,861 | B1 * | 7/2016 | Tovino .................... H04L 67/02 |
| 9,450,904 | B2 * | 9/2016 | Wheeler ................. H04L 51/52 |
| 9,686,087 | B2 | 6/2017 | Chang et al. |
| 9,876,744 | B2 | 1/2018 | Liu et al. |
| 9,959,355 | B2 | 5/2018 | Chitta et al. |
| 10,078,701 | B2 | 9/2018 | Chitta et al. |
| 10,237,213 | B2 | 3/2019 | Breedvelt-schouten et al. |
| 10,805,409 | B1 | 10/2020 | Ledet |
| 2002/0085030 | A1 | 7/2002 | Ghani et al. |
| 2003/0229722 | A1 | 12/2003 | Beyda |
| 2004/0059781 | A1 * | 3/2004 | Yoakum .................. H04L 51/04 709/204 |
| 2004/0249890 | A1 * | 12/2004 | Fellenstein ........... H04L 51/224 709/217 |
| 2005/0027708 | A1 | 2/2005 | Mueller et al. |
| 2006/0111895 | A1 * | 5/2006 | Blaedow ................. G06F 40/40 704/10 |
| 2006/0210034 | A1 | 9/2006 | Beadle et al. |
| 2007/0061423 | A1 | 3/2007 | Accapadi et al. |
| 2007/0067398 | A1 | 3/2007 | Karmarkar |
| 2009/0106365 | A1 | 4/2009 | Drory et al. |
| 2009/0307610 | A1 | 12/2009 | Ryan |
| 2012/0166242 | A1 | 6/2012 | Bentley et al. |
| 2012/0297322 | A1 | 11/2012 | Malik |
| 2013/0179211 | A1 | 7/2013 | Murphy et al. |
| 2014/0235282 | A1 | 8/2014 | Kansal et al. |
| 2014/0257903 | A1 | 9/2014 | Herscovici et al. |
| 2015/0172248 | A1 * | 6/2015 | Mansfield ........... H04L 65/4025 709/206 |
| 2016/0173430 | A1 * | 6/2016 | Foladare ................ H04L 67/02 709/206 |
| 2016/0308797 | A1 | 10/2016 | Lu |
| 2017/0149865 | A1 | 5/2017 | Banatwala et al. |
| 2018/0123986 | A1 | 5/2018 | Faulkner et al. |
| 2018/0309708 | A1 | 10/2018 | Potvin |
| 2019/0140996 | A1 | 5/2019 | Silberstein et al. |
| 2020/0092238 | A1 * | 3/2020 | Bostick ................. H04L 51/222 |
| 2020/0336443 | A1 | 10/2020 | Pottier |

OTHER PUBLICATIONS

"Non Final Office Action Issued in U.S. Appl. No. 16/389,847", dated Apr. 13, 2021, 17 Pages.

Avrahami, et al., "QnA: Augmenting an Instant Messaging Client to Balance User Responsiveness and Performance", In Proceedings of the ACM conference on Computer supported cooperative work, vol. 6, Issue 3, Nov. 6, 2004, pp. 515-518.

"How do I get a notification when a specific WhatsApp contact goes online on Android or iOS?", Retrieved from: https://www.quora.com/How-do-I-get-a-notification-when-a-specific-WhatsApp-contact-goes-online-on-Android-or-iOS, Jul. 10, 2019, 3 Pages.

Pal Juraj, "Address Your Team's Most Burning Questions in Slack with our New Integratio", Retrieved from: https://blog.sli.do/introducing-slido-for-slack/, May 24, 2018, 9 Pages.

"International Search Report and Written Opinion Issued in PCT Application No. PCT/US20/037682", dated Sep. 16, 2020, 14 Pages.

"Final Office Action Issued in U.S. Appl. No. 16/389,847", dated Dec. 8, 2020, 16 Pages.

"Non Final Office Action Issued in U.S. Appl. No. 16/389,847", dated Jun. 1, 2020, 14 Pages.

* cited by examiner

METHOD AND SYSTEM OF SYNCHRONIZING COMMUNICATIONS

TECHNICAL FIELD

This disclosure relates generally to synchronizing communications, and more particularly, to a method and system of synchronizing responses to unanswered questions.

BACKGROUND

In recent years, there has been a significant increase in the use of communication applications that enable a person to communicate with one or more other people in real-time. These applications include instant messaging, virtual conferencing, text messaging, and collaborative work environments, among others. The use of these applications enables participants to communicate with each other in real-time by using electronic devices, without the need to be in the same room at the same. With the significant increase in the use of such applications, the amount of information exchanged via these applications has also substantially increased. An average user may exchange hundreds of messages via one or more communication applications on a daily basis.

As part of communicating, participants may desire to send each other messages which may include one or more questions. If the intended recipient receives the message in a timely fashion and knows the answer to the question(s) asked, they may provide their response promptly. However, when the intended recipient does not receive the message immediately or does do not know the answer, given the number of messages exchanged, there is a chance that the recipient and/or sender may forget the unresolved conversation.

Hence, there is a need for an improved method and system of synchronizing exchange of messages in a communication environment.

SUMMARY

To address these issues and more, in one general aspect, the instant application describes a data processing system having a processor and a memory in communication with the processor where the memory stores executable instructions that, when executed by the processor, cause the data processing system to perform multiple functions. The function may include receiving over a network an indication that the message was sent from the sender to the recipients via a user interface of a first application or a first service and a response to the question was not received within a predetermined time, monitoring a digital location of the sender and the recipients, the digital location being an electronic application or service being currently utilized, determining whether the sender and at least one of the recipients are concurrently using a second application or a second service, and upon determining that the sender and at least one of the recipients are concurrently using the second application or the second service, sending a notification signal over the network to the sender or one of the one or more recipients to notify the sender or the recipient via a user interface element displayed on a client device that the sender and at least one of the recipients are available within the second application or the second service, where the notification signal sent includes a reminder about the question.

In yet another general aspect, the instant application describes a method for synchronous communications between a sender and one or more recipients of a message containing a question. The method may include receiving over a network an indication that the message was sent from the sender to the recipients via a user interface of a first application or a first service and a response to the question was not received within a predetermined time, monitoring a digital location of the sender and the recipients, the digital location being an electronic application or service being currently utilized, determining whether the sender and at least one of the recipients are concurrently using a second application or a second service, and upon determining that the sender and at least one of the recipients are concurrently using the second application or the second service, sending a notification signal over the network to the sender or one of the one or more recipients to notify the sender or the recipient via a user interface element displayed on a client device that the sender and at least one of the recipients are available within the second application or the second service, where the notification signal sent includes a reminder about the question.

In a further general aspect, the instant application describes a non-transitory computer readable medium on which are stored instructions that when executed cause a programmable device to receive over a network an indication that the message was sent from the sender to the recipients via a user interface of a first application or a first service and a response to the question was not received within a predetermined time, monitor a digital location of the sender and the recipients, the digital location being an electronic application or service being currently utilized, determine whether the sender and at least one of the recipients are concurrently using a second application or a second service, and upon determining that the sender and at least one of the recipients are concurrently using the second application or the second service, send a notification signal over the network to the sender or one of the one or more recipients to notify the sender or the recipient via a user interface element displayed on a client device that the sender and at least one of the recipients are available within the second application or the second service, where the notification signal sent includes a reminder about the question.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
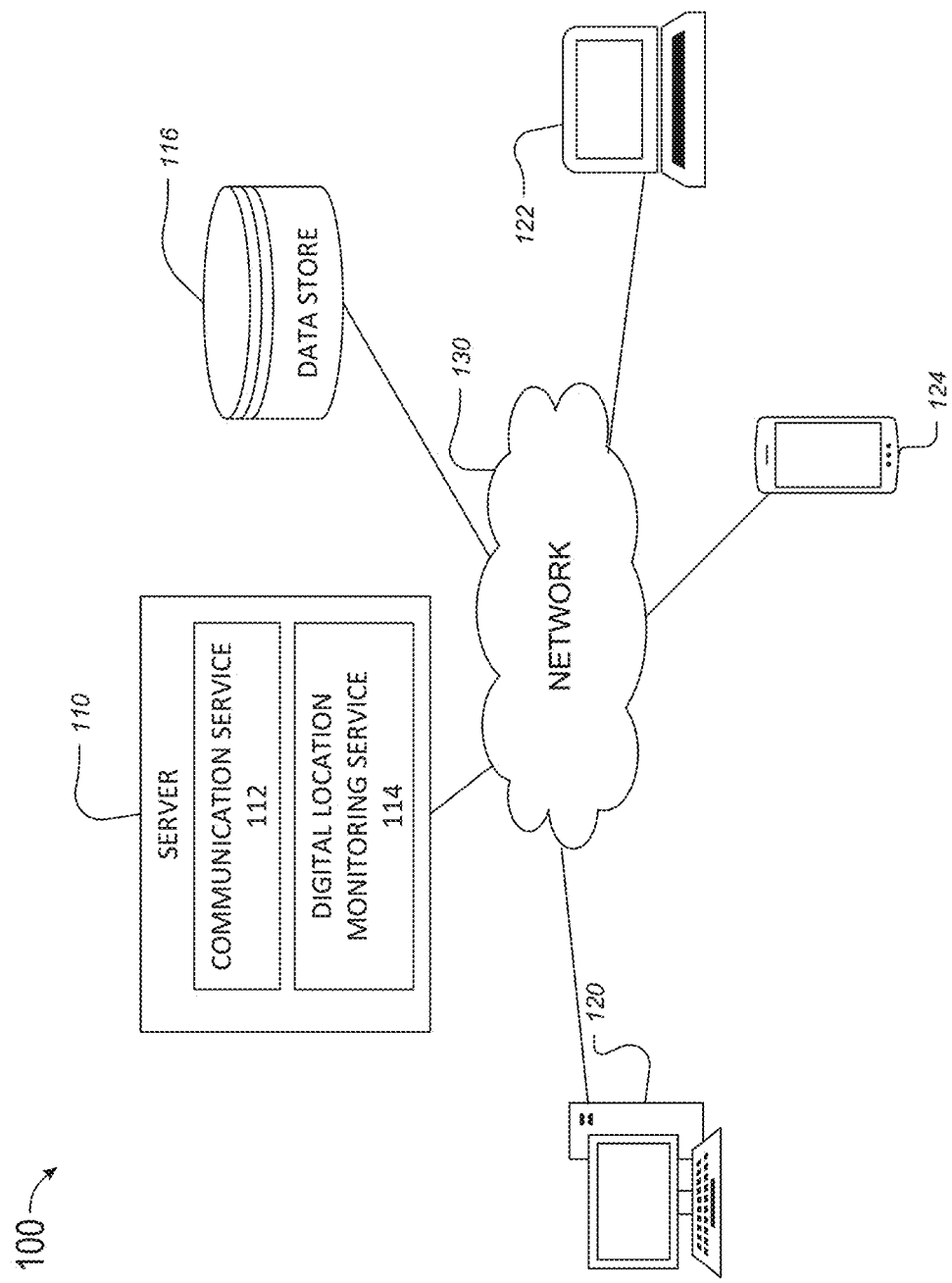
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

A technical problem of existing electronic communication mechanisms is that given the sheer number of electronic messages typical computer and mobile device users receive on any given day, it is likely that if the recipient does not see the message or respond to it right away, they may forget to respond. In some cases, even the sender of the message may fail to recall that the question was not answered until a need for a response becomes imminent. Furthermore, the sender of a message containing a question does not have an efficient way of determining when to follow up with the recipient if a response is not received in a timely manner. For example, the sender may not wish to send repeated reminders when the recipient is away or is not using the communication application. Moreover, the question may require follow up or clarification, and as such a real-time interaction may be beneficial to resolve the matter in a timely fashion. Even if the communication application provides an indication of when a user is available, determining the recipient's presence may require constant monitoring of the application by the sender. This may be time-consuming and inconvenient. Moreover, the status indicator may not always be accurate as the recipient may forget to change it.

Furthermore, even if the application via which the question was asked provides a notification that both parties are available, this may still be inefficient, as it may take a long time for both the sender and the recipient to start using that same application at the same time. This process may be made even more complex when there are multiple recipients. For example, when a sender asks a question in a group messaging thread, there is a technical problem of determining when to provide a reminder for the unanswered question. As a result, the process of ensuring a question is answered in a timely manner may prove to be time consuming and difficult. Thus, there is a need in the art for a method and system of allowing a sender and a receiver of a message that requires follow up to easily and efficiently synchronize their availability.

To address these technical problems and more, in an example, this description provides technical solutions for determining when the sender and recipient(s) of a message containing an unanswered question begin using an application or service at the same time and notifying one or both parties of the other party's presence within that application or service.

To improve the current methods of communications, the technical solution may monitor messages received via an application (e.g., instant messaging application, email application, VoIP application, etc.) to determine if the message contains a question. This may be achieved by utilizing one or more natural languages algorithms which may utilize machine learning (ML) models. Once a message containing a question is detected, the application or service may determine if a response to the question is received from the recipient(s) within a predetermined time. This may be done by monitoring the communication applications to determine if a message is sent from the recipient(s) to the sender and/or analyzing the message to determine if it contains a response to the question. When a response is not detected as being received within a predetermined time, the application or service may transmit a signal to a digital location monitoring service to begin monitoring the parties' digital locations. The digital location monitoring service may then send a request to the sender and recipient(s) to begin sending presence or activity updates when the user's activity changes. The digital location monitoring service may then examine these updates to determine when one or more of the intended recipient(s) and the sender are using the same application or service concurrently. Once a concurrent use is identified, the digital location monitoring service may send a notification signal to the sender and/or the recipient(s) to provide a notification. As a result, the technical solution provides an improved user experience for participants of a communication environment.

As will be understood by persons of skill in the art upon reading this disclosure, benefits and advantages provided by such technical solutions can include, but are not limited to, a solution to the technical problems of users not being able to quickly and efficiently synchronize a time when two or more parties are available to finish a conversation which includes an on unanswered question. Technical solutions and implementations provided here optimize and improve the process of exchanging messages using an electronic communication mechanism. The benefits provided by these solutions include improving user experience, saving time and providing solutions for more efficient communications.

FIG. 1 illustrates an example system 100, upon which aspects of this disclosure may be implemented. The system 100 may include a sever 110 which may be connected to or include a data store 112. In the data store 112 data relating to a communication mechanism such as a messaging application and data relating to user's digital locations may be stored. The server 110 may be responsible for managing communications between various devices during communication sessions and for managing digital location monitoring. For example, the server 110 may run an application, stored for example in the data store 112, that enables instant messaging between various participant devices. To do so, the server may receive signals from one or more participants and transfer those signals to other participants. The signals may be audio, video or other data signals. For example, the server may receive audio signals from a client device as part of a voice over internet protocol (VoIP) call and transmit those signals to a device indicated as the intended recipient of the VoIP call in a communication application. Video signals may be transferred during video-enabled virtual meetings to enable participants to see each other or may be sent as video messages in a communication application.

Data signals may be transmitted to enable exchange of text messages and/or documents between participants.

The server 110 may operate as a shared resource server located at an enterprise accessible by various computer client devices such as client devices 120, 122 and 124. Although shown as a single server, the server 110 may include multiple servers enabling operations of one or more communication applications and operation of the digital location monitoring service.

The server 110 may include and/or execute a communication service 112 such as an instant messaging service. Other examples of communication services may include email, VoIP calls, virtual meetings, voicemail services, videomail services, or collaborative work environments. The communication service 112 may operate to enable exchange of messages between different users. For example, the communication service may manage distribution of messages created by clients in the network, track message histories and participants in conversations, and offer features providing controls for message participants. In one implementation, the server may provide a cloud-based communication service such as an online instant messaging application operating via the network 130. The network 130 may be a wired or wireless network(s) or a combination of wired and wireless networks that connect one or more elements of the system 100.

The server 110 may also include and/or execute a digital location monitoring service 114. A digital location monitoring service may monitor and keep track of users' digital locations when needed. A digital location may include an application or service the user is currently using, an activity the user is currently involved in (talking on the phone, driving a car, exercising), or the user's physical location. In one implementation, the digital location monitoring service may enable other users who are subscribed and have the necessary permissions to see whether other users in a user-specified set of contacts (commonly known as a contact list, buddy list or friend list) are currently available in a specific application. The digital location information for each user may be gathered via a presence status indicator, an activity tracker, a digital calendar, a global positioning system (GPS), accelerometers and other sensors, among other factors. The presence status indicator may be a user selectable indicator which provides options such as: available, busy, idle, do not disturb, or out to lunch, which may be displayed by communication applications. Some applications may enable the user to select one of the presence status indicators to specify their availability. Once a user's availably is determined and/or updated, the digital location information may be sent by a client to the digital location monitoring service 114 which may in turn send the information to users who have elected to receive them for a specified set of contacts. This may be done by way of a server, such as server 110 via the communication service 112. Specifically, the report regarding changed status may be sent to the communication service 112, which may in turn report the changed availability by sending a digital location update to all connected users who have elected to receive such updates regarding that contact. As such, the digital location monitoring service 114 may function or be integrated with the communication service 112. Furthermore, when the communication service 112 is used to provide an online messaging service, the digital location monitoring service 114 may function as a client presence agent to determine the user's presence status. Although shown as one service, the digital location monitoring service is representative of one or more services associated with one or more applications. For example, when multiple applications are used by an overlapping group of users, digital location information may be collected and shared between digital location monitoring services associated with each application.

The system 100 may also include a sender client device 120 and a first recipient client device 122 and a second recipient client device 124, each of which may be connected via the network 130 to the server 110. Each of the client devices 120, 122 and 124 may include or have access to an application which functions with the communication service 112 to enable users of each device to participate in communication sessions such as messaging sessions. It should be noted that although client device 120 is labeled as a sender device and client devices 122 and 124 are labeled as the recipient device, each of the client devices 120, 122 and 124 may become a sender or a receiver during a communication session.

The client devices 120, 122 and 124 may be any type of device that can communicate with the network, such as, personal or handheld computing devices having or being connected to both input and output elements. For example, client devices 120, 122 and 124 may be one of: a mobile telephone; a smart phone; a tablet; a phablet; a smart watch; a wearable computer; a personal computer; a desktop computer; a laptop computer; a gaming device/computer; a television; a thick client; a thin client; a browser-based client; an application executing on a device; an embedded widget operating on a device and the like. This list is for example purposes only and should not be considered as limiting.

Figure 2:
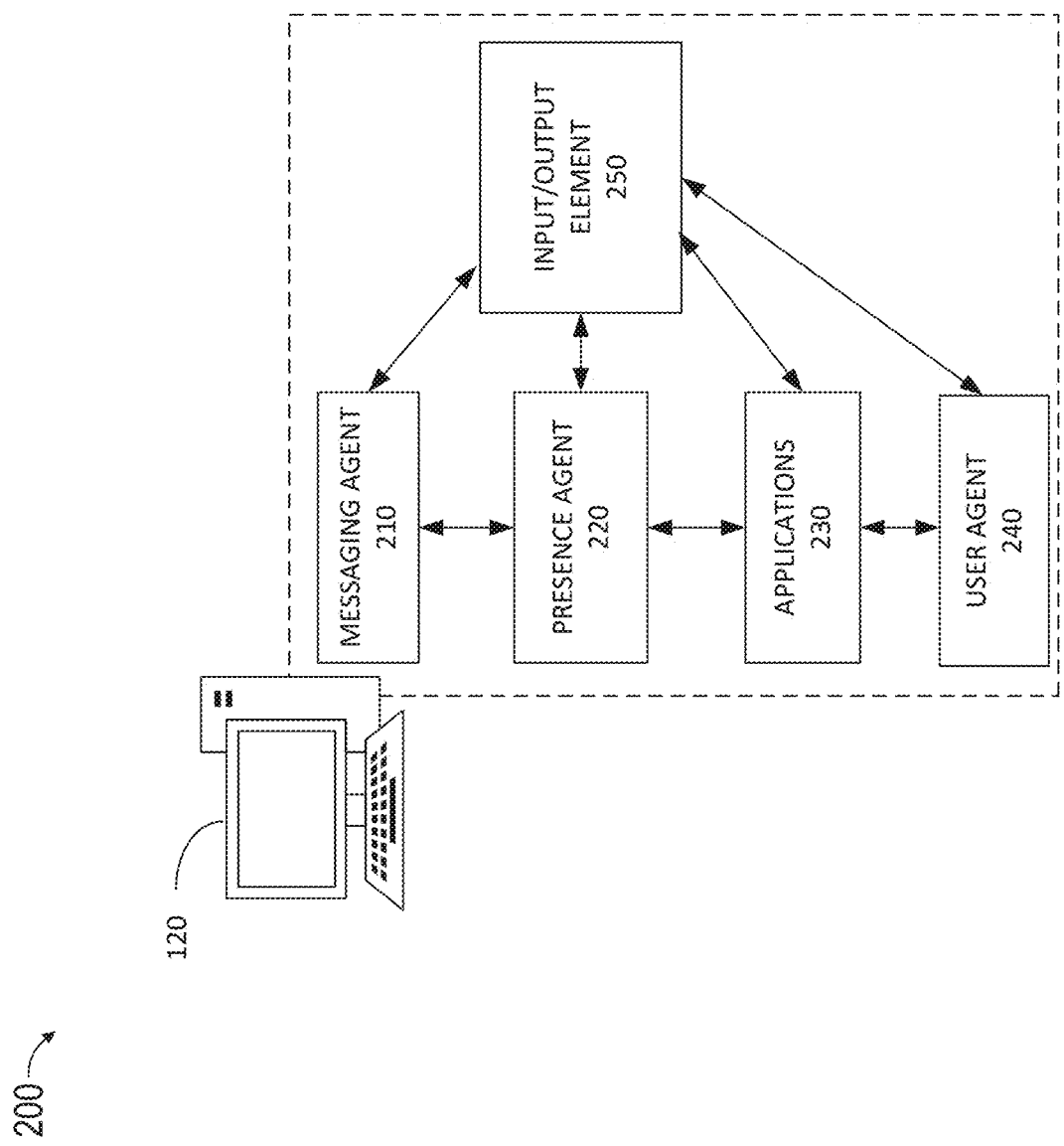
FIG. 2 depicts an example client device upon which aspects of this disclosure may be implemented.

FIG. 2 depicts an example client device 120 upon which aspects of this disclosure may be implemented. In one implementation, client device 120 may include a messaging agent 210, a digital location agent 220, one or more applications 230, and a user agent 240 each in communications with an input/output element 250. Each application 230 may be a computer program executed on the client device that configures the device to be responsive to user input to allow a user to communicate with another user, among other tasks. The application may send, receive, and make data (including documents and audio/video data) available by for example displaying the data on an output element of the client device. Examples of suitable applications include, but are not limited to, an email application, an instant messaging application, a collaborative work application, a conferencing application, a VoIP application, a videomail application, a voicemail application, and any other application where a document can be shared between two or more users.

In some examples, applications 230 may include online applications that are run on the server 110 and provided via an online service as described above. In one implementation, web applications may communicate via the network 130 with the user agent 240, which for example may be a browser executing on the client device 120. The user agent 240 may provide a user interface (UI) that allows the user to interact with the application and exchange messages with various other users. The UI may be displayed on a display device of the client device 120 by utilizing for example the user agent 240. In some examples, the user agent 240 may be a dedicated client application that provides a UI and access to electronic communications which may be stored in the data store 112. In other examples, applications used to communicate with other users may be local applications such as the applications 230 that are stored and executed on the client device 120 and provide a UI that allows the user to interact with the application.

The applications 230 may be in communications with or may include one or more messaging agents such as messaging agent 210. The messaging agent 210 may enable communication with the communication service 112 to for example facilitate a messaging session. It should be noted that the client device may include other types of agents which may facilitate other types of communications. The messaging agent 210 may be in communication with a digital location agent 220 which may function to determine the digital location of the user and/or periodically query the digital location service 114 to access one or more current presence indicators for each participant included in a list of participants identified in the one or more applications 230.

In one implementation, the digital location agent 220 may collect information from one or more applications of the client device including the applications 230 and the messaging agent 210 to determine the digital location of the user. The information collected may include the presence status indicator from one or more communications applications. As discussed above, the presence status indicator may be used by an application to indicate the availability of the user and each user-specified contact in a list of contacts. In addition to the presence status indicator, the digital location agent 220 may collect other information indicative of the user's use of various applications and or the user's physical location. For example, the digital location agent 220 may make use of detectors provided by one or more applications available via the client device to detect the user's current status and activity. The information collected may come from the user's calendar (e.g., indicating the user is in a meeting), to-do list, virtual conferencing application (e.g., indicating an on-going conference), a presentation application (e.g., indicating the user is presenting a document), a work-related application (e.g., a word processing document indicating the user is preparing a document, a programming mode showing the user is interacting with a programming software interface), a VoIP application, a GPS indicating the user is at a certain location, an accelerometer indicating the user is in a car, and the like. For a mobile client device such as a mobile phone, the information collected may include whether the user is on a cellular call, whether they are driving (e.g., using a GPS or accelerometer), whether they are walking, and the like. All of this digital location information may be collected, aggregated and examined by the digital location agent 220 and/or sent to the digital location monitoring service to determine the user's current digital location. In this manner, the digital location monitoring service can detect anytime a sender and one or more recipients of an answered questions are in the same digital location or within a certain physical distance from each other and thus identify opportunities for resurfacing the question. In one implementation, when the digital location agent 220 detects that the digital location of the user has changed, it may automatically report the changed digital location to the digital location monitoring service 114 which may use the information to determine shared availability and/or may forward the information to other users.

In addition to detecting and reporting the user's digital location, the digital location agent 220 may also receive digital location updates for other users from the digital location monitoring agent 114. These digital location updates may be stored in a database and displayed to the user via one or more applications for user-specified contacts in a list of contacts for display.

The input/output element 250 may be used to display one or more UIs associated with applications 230 and to receive inputs from the user which may be used to engage in communications. The internal hardware structure of a client device is discussed in greater detail in regard to FIGS. 7 and 8.

Figure 3A:
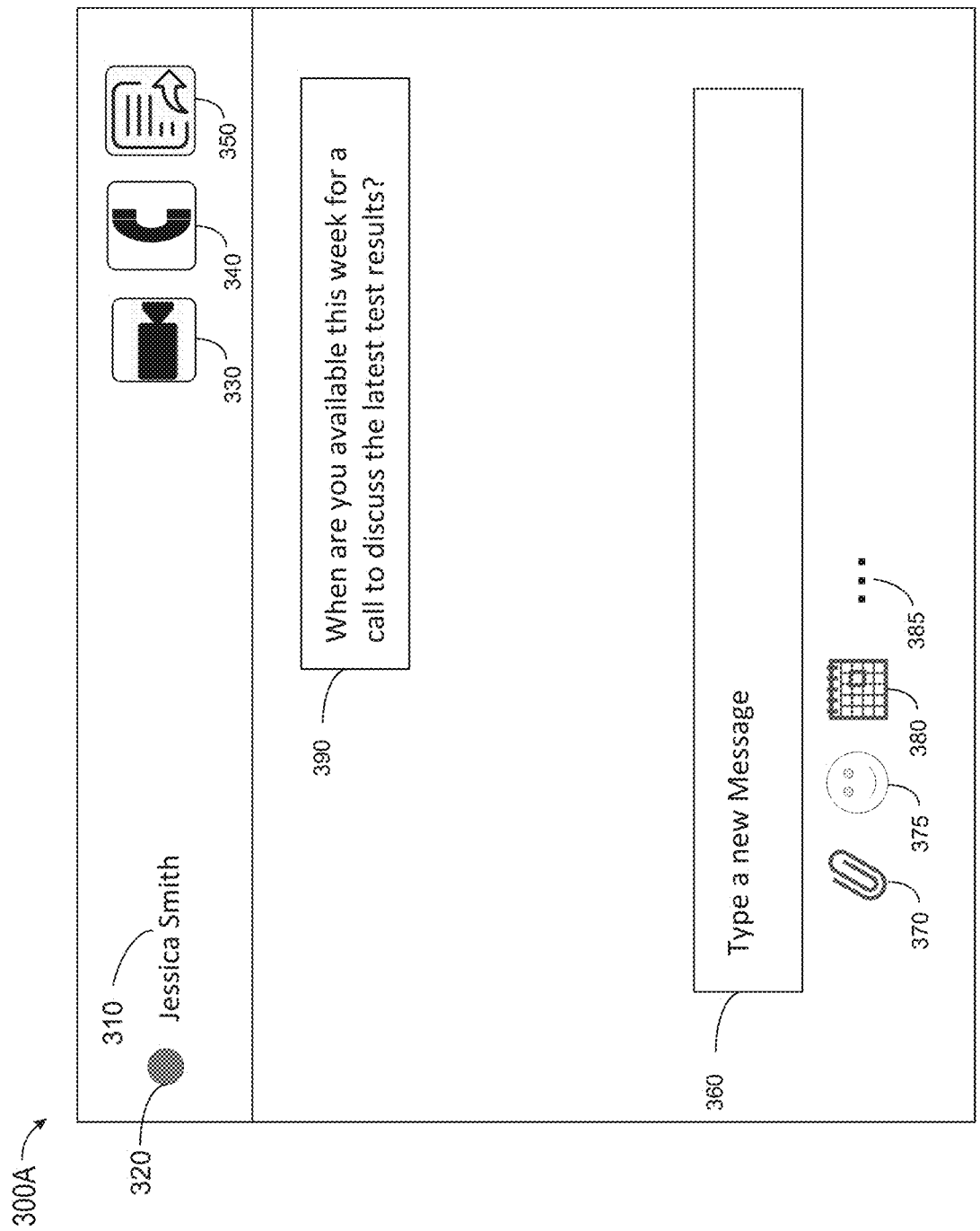
FIGS. 3A-3B depict various example user interface (UI) screens which may be presented to a participant during a session that can be used to exchange a message with another user.
Figure 3B:
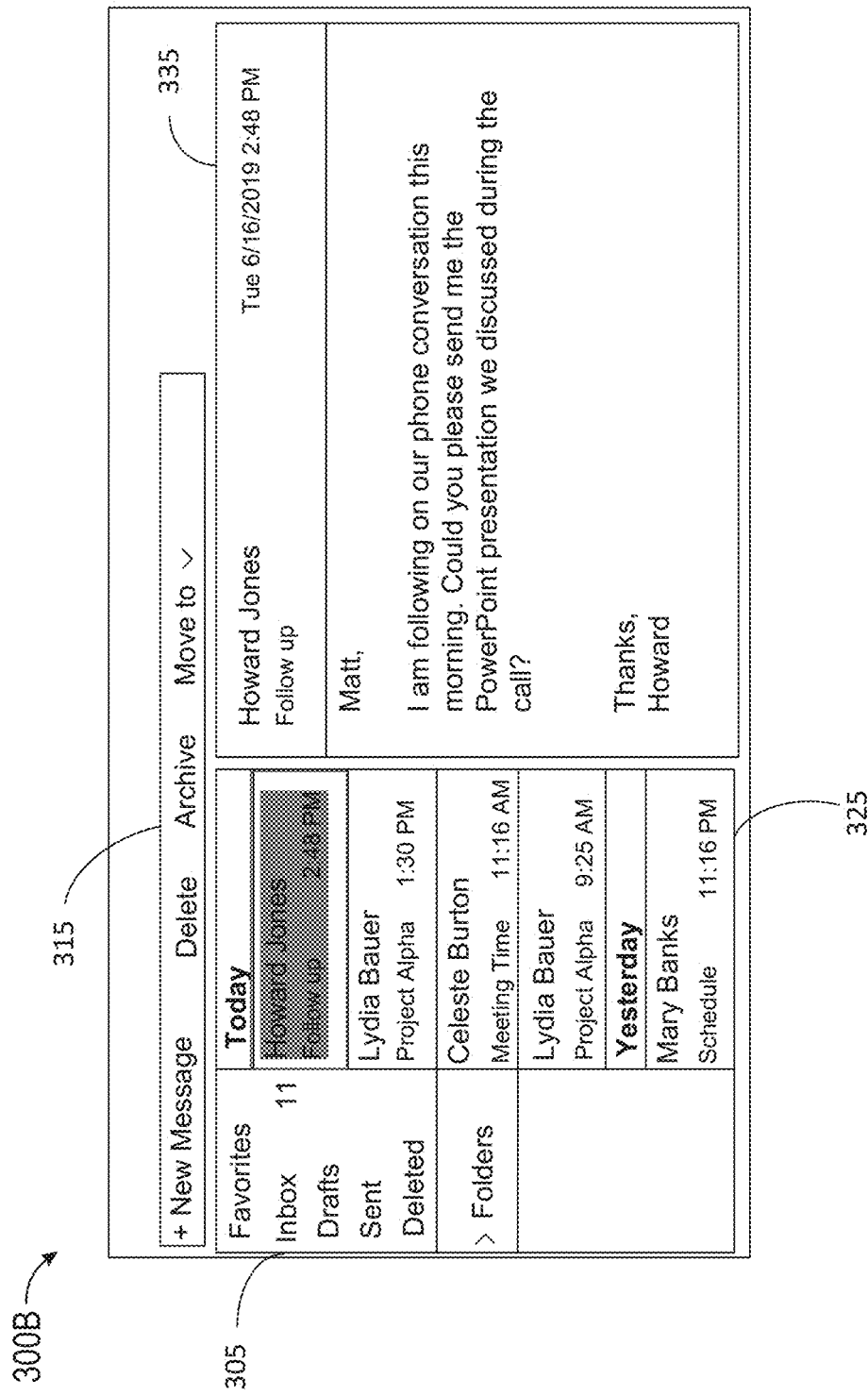

FIGS. 3A-3B illustrate example UI screen which may be presented to a participant during a session, such as an instant messaging session, that can be used to exchange a message with another user. The UI screen 300A of FIG. 3A may for example be indicative of a messaging session between the user and a contact named Jessica Smith. In one implementation, the UI screen 300A is displayed by the messaging application running on the user's client device. Alternatively, the UI screen 300A may be shown via an online messaging service.

The UI screen 300A may include a UI element 310 for displaying the name of the contact with which the user has started a messaging session, and a contact presence status indicator 320 for displaying the presence status of the contact shown by the UI element 310. In the example shown in UI screen 300A, the presence indicator 320 displays a circle which may be indicative of the contact being busy. Other presence statuses may include: available, unavailable, do not disturb, idle, out to lunch, be right back, and others. In one implementation, a default status (e.g., available) may be selected by the messaging application when it is first opened. The default status may be changeable at any time by the user, for example, by utilizing a UI menu of the messaging application/service. Once a change in the status is detected (e.g., the user first opens the application and the status changes from unavailable to available), the updated status may be sent to all client devices (or users utilizing an online messaging service) which have included the contact in their list of contacts. As a result, when a user such as the user of UI screen 300A chooses to begin a messaging session with a contact, the contact's presence status may be displayed by the presence status indicator 320. It should be noted that this presence status indicator may be different from the digital location determination made by the user's digital location agent. As discussed above, that determination may include taking into account other factors in addition to the presence indicator.

The UI screen 300A may also include a menu button 330 for engaging in a video conference with the contact, a call button 340 for initiating a VoIP audio call with the contact, and a share screen button 350 for beginning to share a screen with the contact. Thus, although UI screen 300A displays an instant messaging scenario, the same communication application may be used to engage in instant messaging, video conferencing, VOIP calling, and sharing of a screen with a contact. In this manner, information about a user's activity may easily be collected from one communication application to detect the user's availability. Furthermore, unresolved communications may be detected and tracked from various communication channels, as discussed further below.

The UI screen 300A may also include an input box 360 for entering contents to be shared with the contact. In this manner, the user of the UI screen 300A may enter a text in the input box 360 to send as an instant message to the contact identified by UI element 310. In addition to entering text into the input box 360, the user may utilize other menu options such as a menu button 370 for attaching a file or menu button 375 for entering an emoticon into the input box 360. The UI screen 300A may also include a menu button 380 for scheduling a virtual conference with the contact, and a menu button 385 which may display a context menu providing other options such as sending a video message, sending a contact, creating a poll, and others.

Upon entering input into the input box 360 and pressing enter or clicking on a share button (not shown), the entered text may be instantly transmitted to the contact. If the contact has their corresponding communication application (or online communication service) open, the message may be immediately transferred to and/or displayed on the UI of the contact's communication application/service. However, if the contact does not have their application or service open (e.g., their computer is not turned on or the application is not open), the message may be stored in a database associated with the communication application/service to be displayed the next time the contact opens the communication application/service. At the same time, the message may be displayed within the UI screen 300A of the user as a sent message in a UI element such as element 390. To provide better means of synchronizing users' exchange of information, the message sent via the UI screen 300A may be examined to determine if it contains a question. This may be done via one or more natural language analysis algorithms and/or voice recognition algorithms when the message is an audio or video message, as discussed in more detail below.

When it is determined that the message includes a question, the communication application or service may begin tracking the amount of time that passes before a response to the message is received. This may be done by initializing a timer, once the determination is made. The timer may be operated by the communication application of the sender or the messaging service of the server. Alternatively, the process of determining if a message contains a question and tracking the amount of time passed may be performed by a separate application or service (e.g., the digital location monitoring agent or service). Once the amount of time passed surpasses a predetermined threshold (e.g., two hours has passed since the sender sent a message containing a question) and a response is not detected as being received, the communication application of the sender or the messaging service of the server may send a request to the digital location monitoring service to create a record for the unanswered question and begin monitoring the sender and the recipient(s) digital location.

FIG. 3B depicts an example UI screen 300B which may be presented to a participant utilizing an email communication application. The UI screen 300B may include a mailbox menu pane 305 which contains links for accessing different folders in the mailbox and a summary email pane 325 containing a list of emails with certain identifying information such as the senders, titles and date/time of the emails. The email selected from the summary email pane 325 is highlighted (i.e., has a gray background) to indicate that this is the email shown in the email pane 335. The UI screens 300B may also include a tool bar 315 containing various links for tools to use for composing a new email message or functions to perform with the selected email.

To ensure synchronicity between a sender and a receiver of an email requiring follow up, the email communication application may examine the contents, context and/or other parameters of an email sent/received to determine if the email contains a question and as such requires a follow up. To do so, first the contents of the email may be examined to determine if the email includes a question. The mechanism used for determining if a message contains a question may include identifying markers (e.g., a question mark), parsing the text to determine if one or more sentences are formed as questions and/or utilizing natural language ML models to examine the content more carefully to look for questions.

In addition to identifying questions, other parameters may be examined to determine if the email requires a follow up. For example, in order to prevent the users from receiving numerous notifications, in addition to merely checking contents of emails, the application/service may also examine other parameters such as whether any keywords indicating urgency (e.g., urgent, asap) are included, whether a flag indicating high importance is assigned to the email and/or whether the sender and/or the receiver has marked the email as requiring follow up. In one implementation, an option may be made available to users to select for each email message to indicate that the email message requires follow up notification. Although discussed with respect to an email application, any application may include other qualifying parameters for determining if a follow up to a message is needed. For example, one or more applications may include options for a sender to choose to flag the message as one requiring follow up.

Once the email communication application/service determines that an email contains a question and/or requires follow up, it may begin determining if a response to the email is received within a predetermined time. This may be done by utilizing a timer that measure the amount of time passed before a response to the email is received. The timer may be operated by the communication application of the sender (e.g., the email application or service) or the digital location agent or service. Once the amount of time passed surpasses a predetermined threshold (e.g., 24 hours has passed since the sender sent a message containing a question and requiring follow up) and a response is not detected as being received, the email communication application of the sender or service may send a request to the digital location agent of the recipient (or the digital location monitoring service) to begin monitoring the digital location of the sender and the recipient(s). It should be noted that different applications may have different amounts of time for determining if a response to a question has not been answered timely. For example, the threshold amount of time for an instant messaging application may be 2 hours, while for an email application it may be 24 hours.

In one implementation, a user has to have agreed to share their digital location with other users before notification could be provided. This may require the application to seek permissions from users before any digital location information is shared with others. In one implementation, applications may provide an option for users to select which contacts or which group of contacts they wish their share their digital or physical locations with.

When the sender and one or more recipients are determined as being available within the same space (e.g., same application, same service, same physical vicinity, and the like), a notification may be sent via the digital monitoring service to the digital location agent of the sender and the recipients that are identified as being available. The digital location agent may then identify the application the user is currently utilizing and send a signal to the application to provide a notification to the user that the other party is available within the same space. Alternatively, the digital monitoring location service may directly send a signal to the application being currently used. In instances where the same space is not an application or service (e.g., it is based on physical proximity or other factors, the digital location monitoring service or digital location agent may provide the notification to the users. of the sender, the presence agent of the sender (or the presence service of the server, as the case may be) may determine if the sender is now available. The notification may be presented to the users by displaying a pop-up UI element.

Figure 4A:
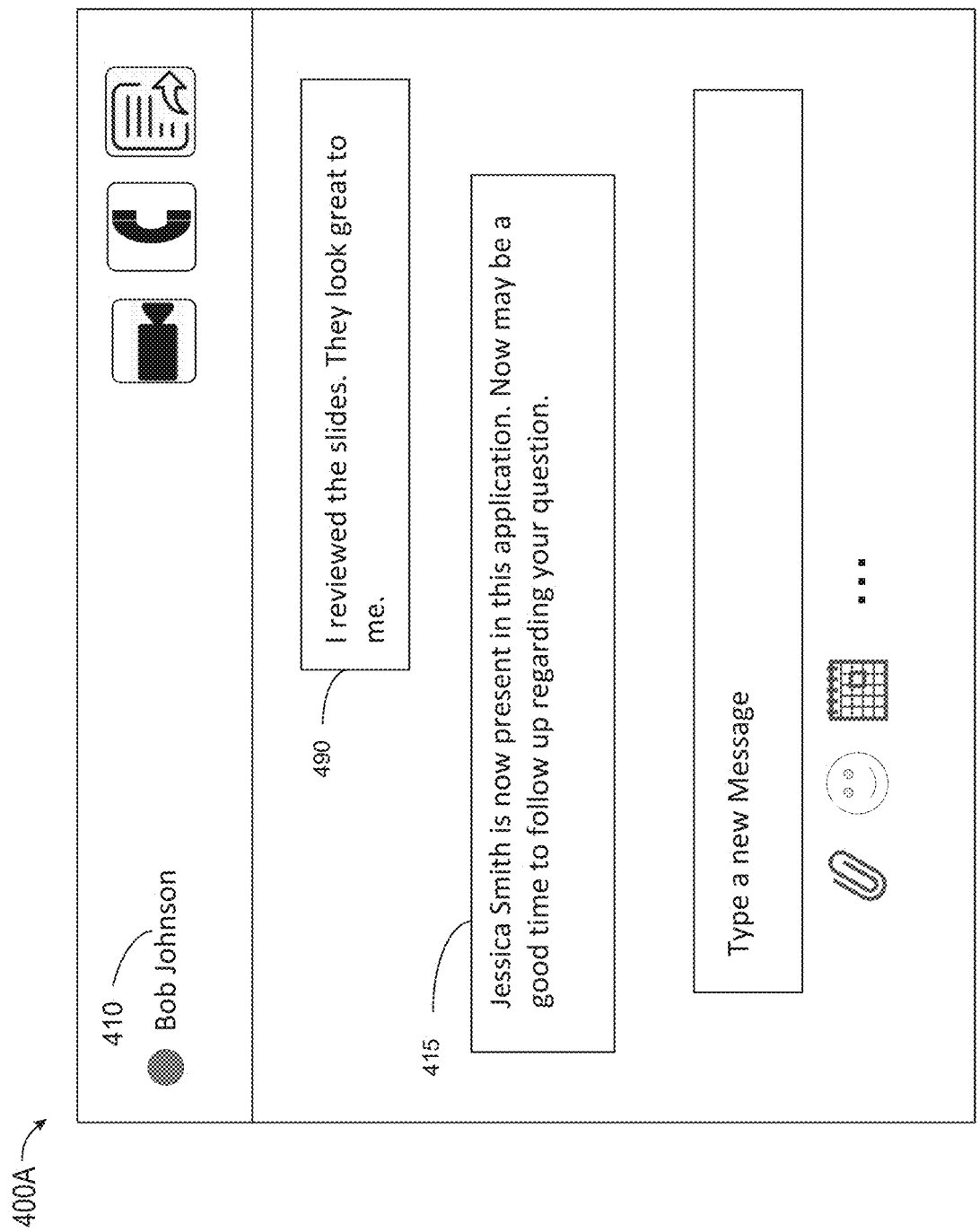
FIGS. 4A-4C depict example UI screens that display notifications to a user that a party with whom they have an unfinished conversation is available.
Figure 4B:
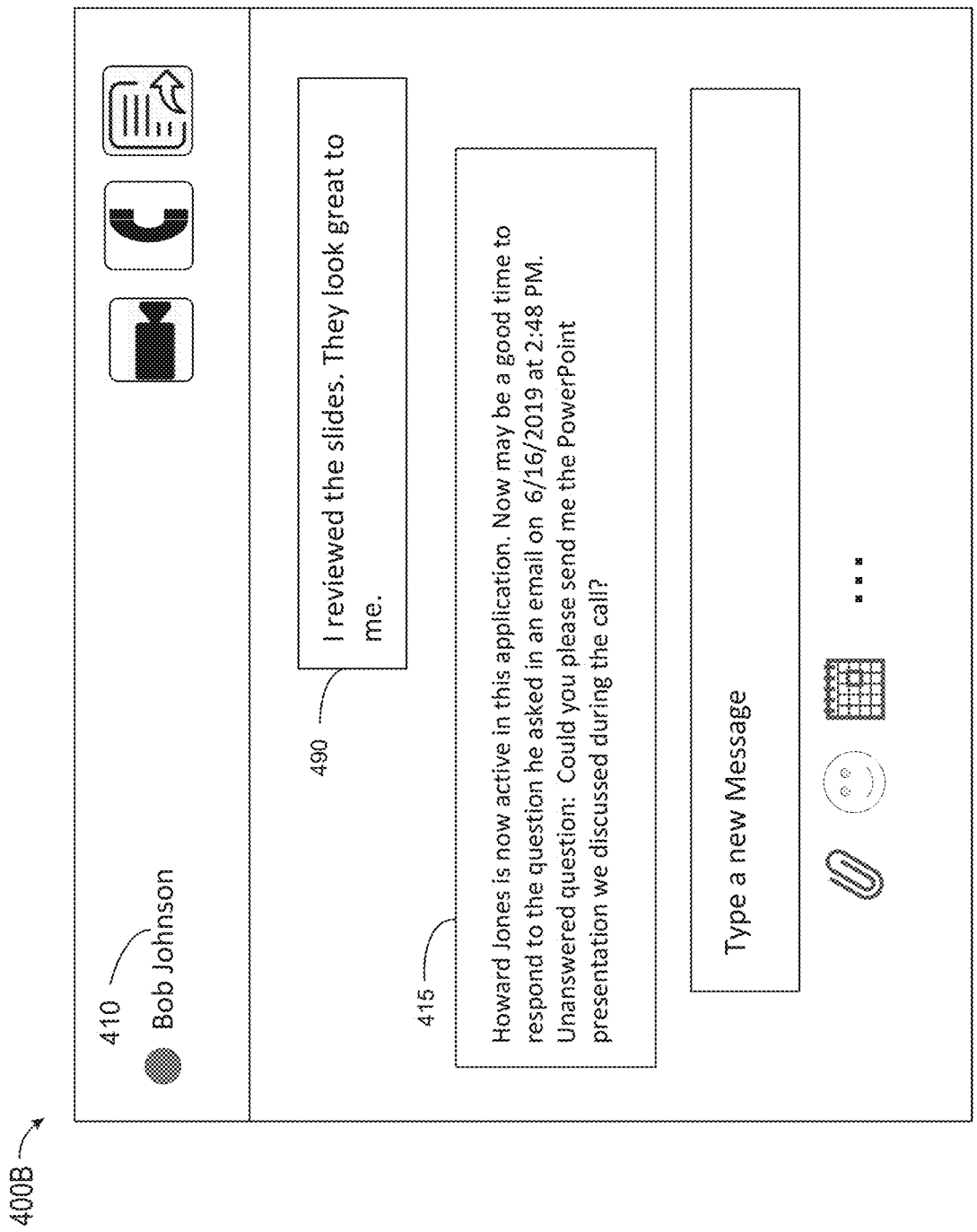
Figure 4C:
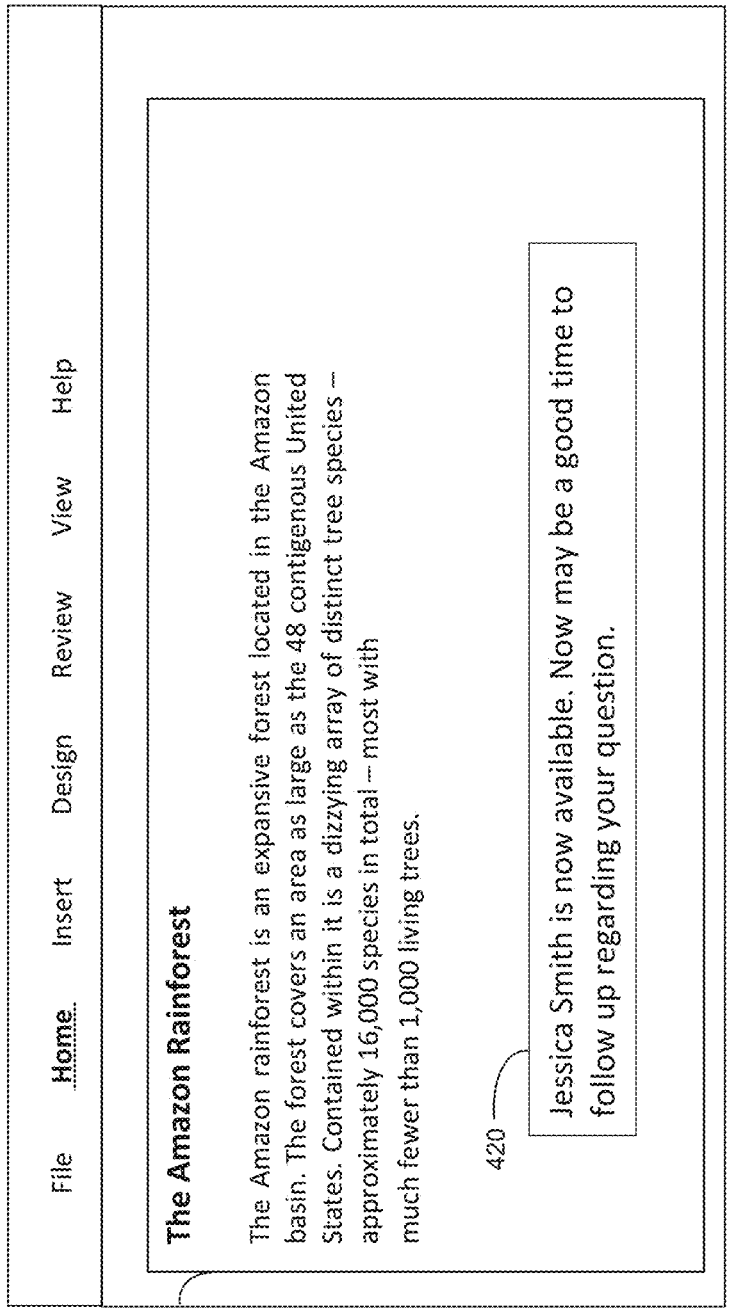

FIGS. 4A-4C depict example UI screens that display notifications to a user that a party with which they have an unfinished conversation is available. For example, UI screen 400A of FIG. 4A depicts a UI screen of a messaging session in a communication application. As shown by the UI element 410 for displaying the name of the contact with which the user is in a messaging session, the user may be actively involved in instant messaging Bob Johnson. For example, the user may have sent the message displayed in the UI element 490 to Bob Johnson and may be waiting for Bob to respond. If during this session, the digital location monitoring service determines that the contact with which the user has an unfinished conversation (e.g., Jessica Smith of FIG. 3A) is also currently using the same communication application, a message may be displayed via the UI element 415 to notify the user that Jessica Smith is also using the same communication application. This provides a notification to the user, who was the sender of the original message that the recipient is not available, thus enabling the user to send a follow up message when the recipient is within the same space. A similar notification may be provided to the recipient (e.g., Jessica Smith) to remind her of the unanswered question and inform her that the sender is within the same space.

In an implementation, the notification messages displayed to the sender and recipient may be different. For example, the notification message to the recipient may remind them that a question was asked of them by the sender and they never responded. In contrast, the notification message displayed to the sender may remind them that they asked a question from the recipient which has not been answered yet. In an example, once a notification message is displayed to a user, the digital location monitoring service discontinues monitoring the party's digital locations. Alternatively, the users may be provided with an option to request that they be reminded later. For example, the UI element 415 may include a button for "remind me next time" and a "dismiss" button for. The "remind me next time" option may be used when the user cannot return to the previous conversation (e.g., they are tending to another important matter) to request that they be notified the next time the other party is available within the same space. The "dismiss" button may be utilized to dismiss the notification, for example when the user can return to the previous conversation or when they do not wish to receive further reminders.

It should be noted that although UI element 415 is depicted as a pop-up menu, other methods of presenting the notification and reminder are also contemplated. For example, although FIG. 4A depicts UI screen 400A of the messaging session between the sender and a new contact, the notification may be presented to the user on any other UI screen of the communication application/service. This may be necessitated for example when the sender closes the messaging session between the sender and the recipient, opens a messaging session with a different contact, begins another form of communication with a contact, or moves to a different UI screen of the communication application for any reason. Moreover, the notification may be provided via any UI element. In one implementation, the notification may be provided to the user via an audio signal. For example, an audio notification may be provided informing the user that the sender and/or recipient is available within the same space.

It should be noted that although the notification sent in UI screen 400A relates to an unanswered question that was sent using the same communication application, notifications may be provided for unanswered questions that were sent using different applications/services. For example, FIG. 4B depicts a UI screen 400B of a messaging session in the communication application displaying a notification about the unanswered question in the email message of FIG. 3B. This may occur in a situation when, after a threshold amount of time has passed without receiving a response, the sender and the recipient are identified as concurrently using the communication application. For example, the recipient may be messaging Bob Johnson as shown by the UI element 490, while the sender is engaged in a different communication with a third party. Upon determining that both users are within the same space, a notification message may be displayed to the recipient via the UI element 415 to inform him that the sender is available within this application.

In one implementation, the notification may include the name of the other party in addition to a reminder of the message containing the question. In an example, the reminder may include information about the question, such as, the date and time the question was received, the application used to send the question and/or a copy of the question itself. Additionally, the notification may include a link to the message upon selection of which the message containing the question may be directly accessed.

FIG. 4C depicts a UI screen 400C of a document editing application displaying a notification about the unanswered question in the instant message of FIG. 3A. This may occur when the document editing application is used to edit and/or view a sharable document 440 (e.g., as a part of a collaborate work environment), and both the sender and at least one of the recipients are accessing, editing and/or viewing the sharable document at the same time. For example, when the sender of the instant message of FIG. 3A and the recipient (Jessica Smith) are both accessing the same document 440, the digital location monitoring service may determine that both parties are available within the same space and send a signal to one or both parties' client devices to notify the users. The signal may then be conveyed to the document editing application which may enable display of a notification via the UI element 420. This is because when both parties are accessing the same document, they are present at the same time and within the same space and may thus be able to use features provided by the application to communicate with each other and resolve the issue.

Although, a document editing application is shown in the UI screen 400C, it should be noted that notification may be provided via any application that provides access to shareable documents that are shared between the sender and one or more recipients.

Figure 5:
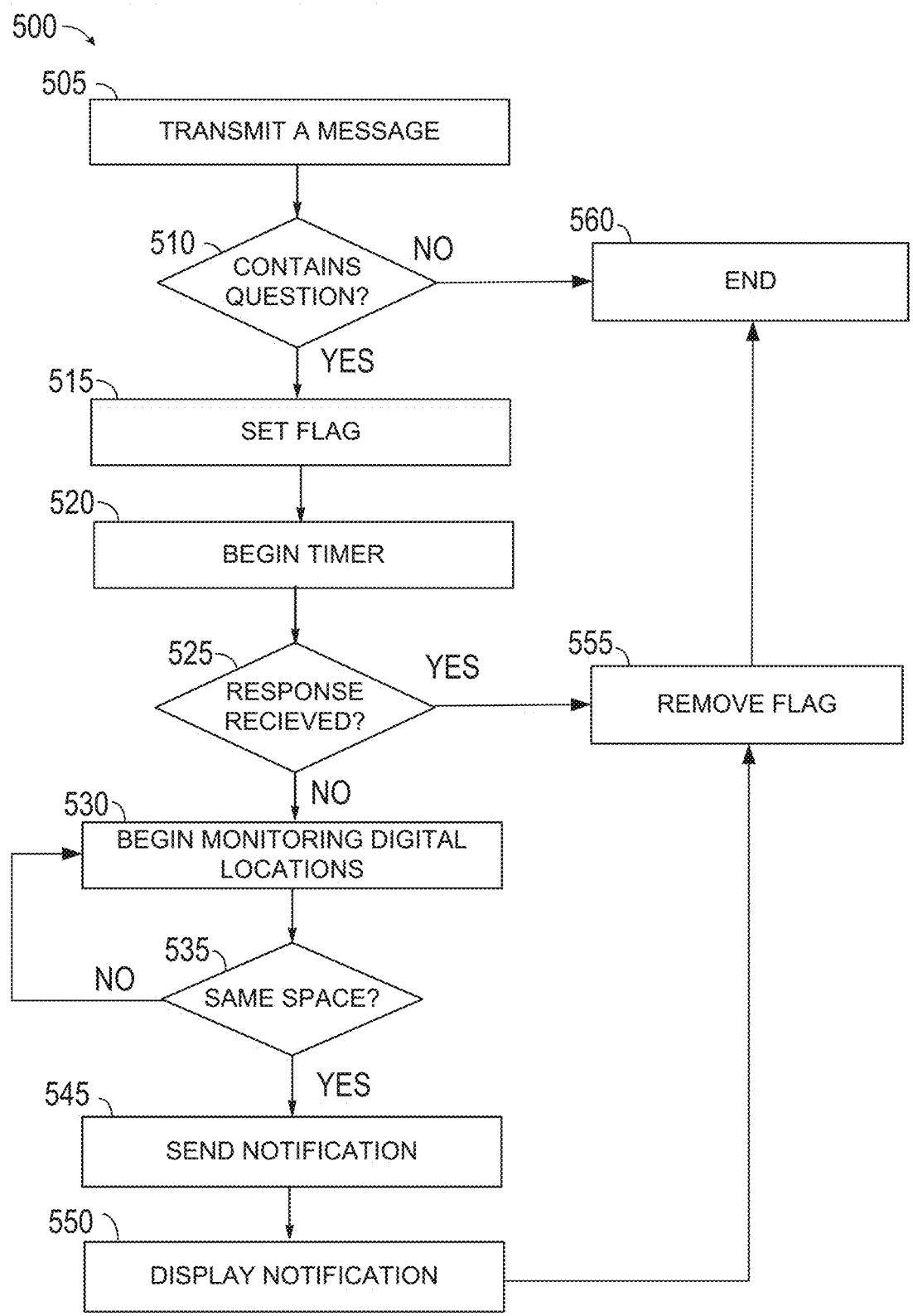
FIG. 5 is a flow diagram depicting an example method for notifying the sender or recipient(s) of an unanswered message containing a question when both parties become available at the same time within the same digital location.

FIG. 5 is a flow diagram depicting an example method 500 for notifying the sender or recipient(s) of an unanswered message containing a question when both parties become available at the same time within the same digital location. At 505, method 500 may begin by transmitting a message from a sender (e.g. a client device connected to a server via an application or a UI of a client device utilizing an online service) to a recipient. The message may be an instant message containing text, emoticons, and/or other characters. The message may also be an email message, a voice-message, a video-message, any other type of text message, and/or a combination of one or more types of messages. The message may be received as an input from the user via a UI displayed on the sender's client device or received as audio/video from an input device in communication with the sender's client device. Once the message is received by the server, the server may transmit the message to the recipient's client device or otherwise make the message available to the recipient via an online service.

Once the message is transmitted from the sender, method 500 may proceed to examine the message to determine if it contains a question, at 510. This may be performed by the sender's client device, the server and/or the recipient's client device (e.g., the local application of the recipient client device). For messages that are not already in a text format (e.g., audio and/or video messages), this may involve first utilizing a voice-recognition algorithm to convert the audio in the message to text before the contents can be examined. Once the message is in a text format, the content of the message may be examined to determine if it contains a question. This may involve utilizing a variety of different mechanisms. For example, a first step may include examining the textual data to determine if it contains a question mark. A second step may involve parsing the text to one or more sentences and determining if any of the identified sentences are written in a question format. In one implementation, one or more text analysis or natural language processing (NLP) algorithms may be utilized to examine the contents, context, formatting and/or other parameters of the text to determine if the message includes a question. Examples of such algorithms include, but are not limited to, term frequency-inverse document frequency (TF-IDF) algorithms and latent Dirichlet allocation (LDA) algorithms.

When method 500 determines that the message does not contain a question, it may proceed to step 560 to end. When, however, it is determined at 510, that the message contains one or more questions, method 500 may set a flag for the message, at 515. This may be done by the server, the recipient client device and/or the sender client device. The flag may indicate that the message needs to have a follow up action, namely that a response to the message should be tracked. The process of setting a flag for the message may include storing the message or information relating to the message in a database associated with the messaging session.

Method 500 may then proceed to start a timer, at 520, to start measuring the amount of time passed since the question was asked (e.g., since the message was sent). The timer may operate as part of the sender's application via which the message was sent, or as part of the communication service provided by the server, or the one used by the recipient. Alternatively, the server and/or the recipient's client device may send a message to the sender's application to request that the sender's client device initialize a timer to begin tracking the amount of time passed before a response is received.

After the timer is set, method 500 may proceed to determine if a response to the question is received within a predetermined amount of time, at 525. The predetermined amount of time may be preset by the application and may vary depending on the type of message received. For example, for instant messages, the predetermined amount of time may be set at 2 hours, while for email messages it may be set at 24 hours. That is because, in general, instant messages are generally exchanged at a faster rate than email messages. In one implementation, the amount of time may be variable and/or could be set by the user.

Determining whether a response to the question was received, may simply involve examining to see if a message was sent from the recipient to the sender. Alternatively, the process may also include utilizing one or more natural languages algorithms to examine the contents, context, formatting and/or other parameters of the message to determine if it relates to the question asked and/or if it is a response. The process of determining whether a response was received may be performed by the recipient client device (e.g., by determining if a user input was received in the session), by the server (e.g., by identifying if a message was received from the recipient's client device), and/or by the sender client device (e.g., by determining if a message originating from the recipient was received from the server).

When it is determined, at 525, that a response was received within the predetermined time, method 500 may proceed to remove the flag, at 555. This may be because, once a message is received within the predetermined time frame, no further monitoring or action may be required for the message. Thus, the flag may be removed from the database at which it was stored. Alternatively, the database may be updated to indicate that the flag was resolved.

Referring back to step 525, when it is determined that a response was not received within the predetermined time frame, that is the amount of time measured by the time exceeds the predetermined amount of time and yet no response has been received, method 500 may proceed to begin monitoring the digital location of both the sender and the one or more recipients, at 530. This may involve, sending a signal to the server (e.g., digital location monitoring service) to notify the server that the users' digital locations need to be tracked. The server may in response send a message to the sender and each of the recipients requesting them to begin sending digital location updates to the service. In an alternative implementation, the sender and/or recipient may send a request directly to the other party to receive their digital location updates. This may occur in instances where digital location monitoring is performed by the sender or recipient's client device.

In response to the request, the sender and/or each of the recipients may begin sending digital location updates to the service and/or the other party. This may be achieved by examining a presence status indicator of one or more applications or services used by the sender and each of the recipients, in addition to taking other factors into account. These may include examining activity indicators which signal the user's use of any application or signal. Additional factors such as the user's calendar, to do list, GPS signals, and others may also be examined and considered for determining availability. These factors may be examined and aggregated by the sender and recipients' client devices or sent to the server to determine the user's present digital location (the application or service currently used by the user, the task being currently performed by the user and/or the user's physical location). In one implementation, anytime there is a change in a user's digital or physical location, a signal may be sent to the digital location monitoring service, which may in turn examine these signals to determine, at 535, if the sender and one of the recipients are currently within the same physical or digital location.

Once method 500 determines that the sender and one of the recipients are concurrently within the same space, method 500 may proceed to send a notification signal, at 545. This may involve the digital location monitoring service sending a notification signal to one or both of the sender and the recipient. In response, a notification may be displayed at the sender and/or recipient's client device, at 550, before method 500 proceeds to remove the flag, at 555. Once the flag is removed, method 500 may proceed to end, at 560.

If the sender and recipient are not identified as being in the same space, at 535, method 500 may return back to step 530 to continue monitoring the digital location of the sender and recipient(s) until they are determined as being within the same space.

Thus, in different implementations, a technical solution may be provided to enable synchronous follow up interactions between a sender and one or more recipients of a message containing a question across multiple modalities. To enable efficient exchange of messages, a message sent via a first application may be examined to determine if it includes a question, and if so whether a response is received within a predetermine amount of time. Upon determining that no response has been received, the digital location of the recipients and the sender may be monitored to find a window of time when at least one of the recipients and the sender become available within the same space at the same time. Once both the sender and one of the recipients are identified as being available within the same space, a notification may be sent to one or both parties to enable further exchange of messages during a convenient time.

Figure 6:
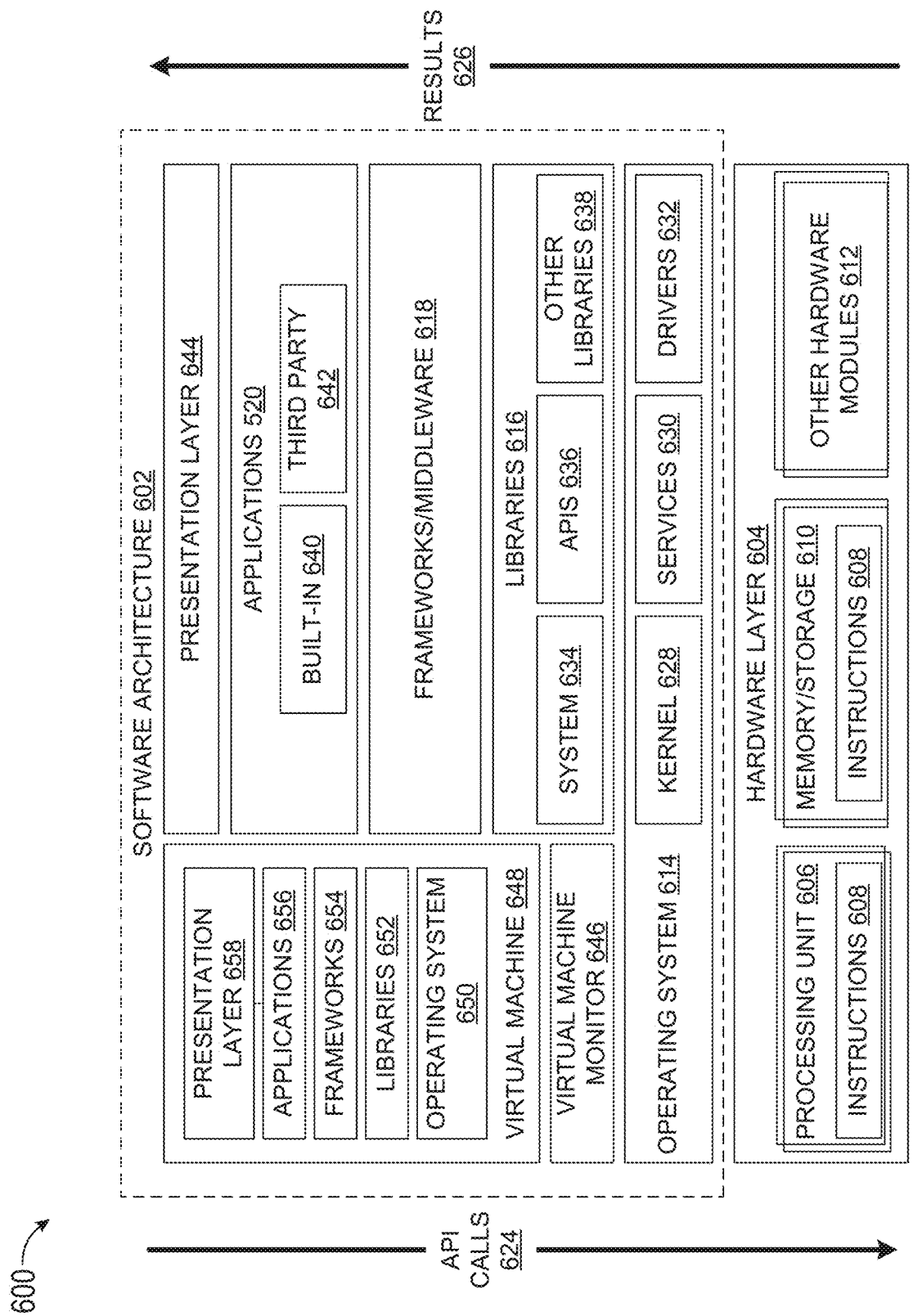
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 608 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 624. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 620 and/or third-party applications 622. Examples of built-in applications 620 may include, but are not limited to, a contacts application, a browser application, a location application, a media application, a messaging application, and/or a game application. Third-party applications 622 may include any applications developed by an entity other than the vendor of the particular system. The applications 620 may use functions available via OS 614, libraries 616, frameworks 618, and presentation layer 624 to create user interfaces to interact with users.

Some software architectures use virtual machines, as illustrated by a virtual machine 628. The virtual machine 628 provides an execution environment where applications/modules can execute as if they were executing on a hardware machine (such as the machine 600 of FIG. 6, for example). The virtual machine 628 may be hosted by a host OS (for example, OS 614) or hypervisor, and may have a virtual machine monitor 626 which manages operation of the virtual machine 628 and interoperation with the host operating system. A software architecture, which may be different from software architecture 602 outside of the virtual machine, executes within the virtual machine 628 such as an OS 650, libraries 652, frameworks 654, applications 656, and/or a presentation layer 658.

Figure 7:
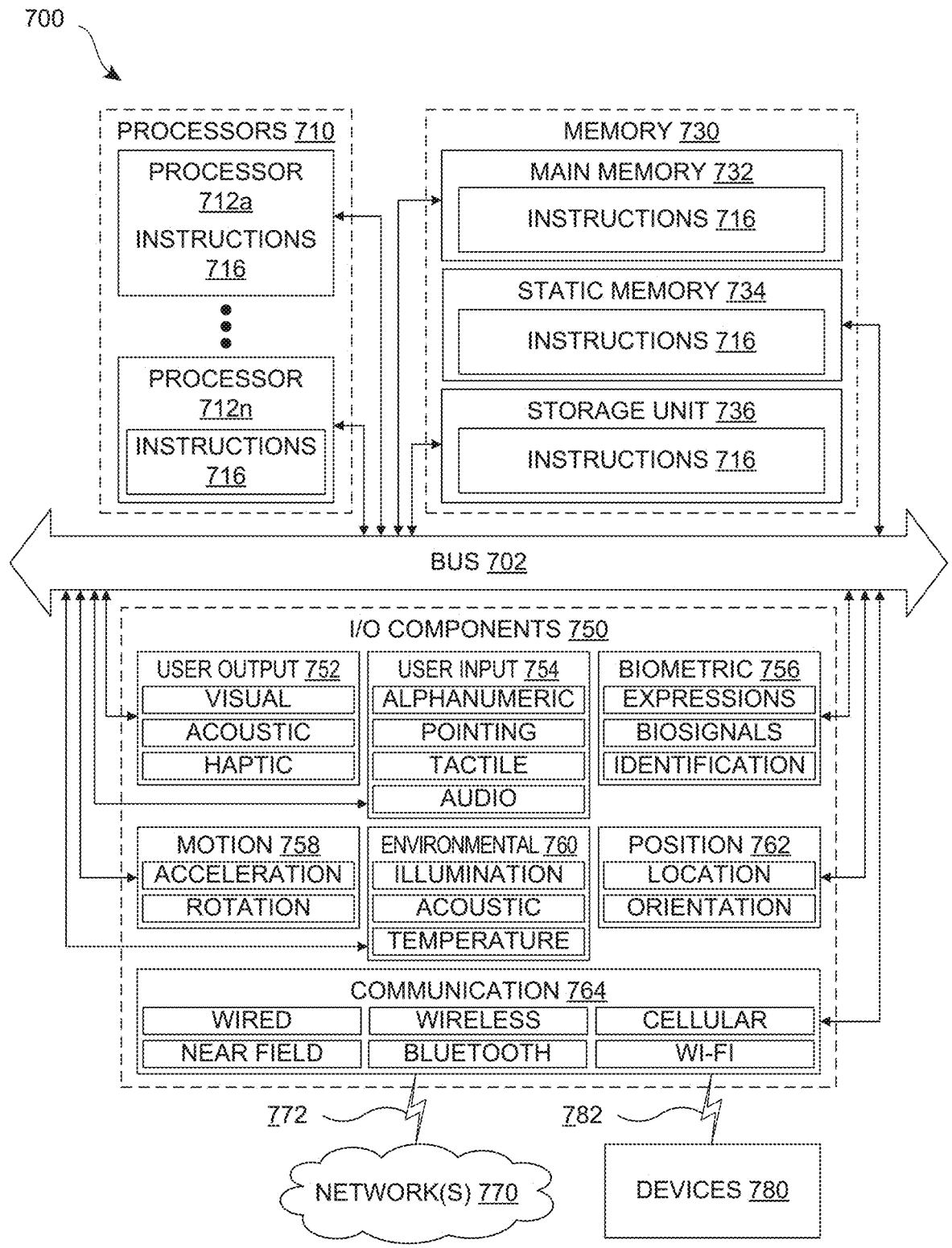
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a memory in communication with the processor, the memory storing executable instructions that, when executed by the processor, cause the data processing system to perform functions of:

receiving over a network an indication that a message containing a question was sent from a sender to one or more recipients via a user interface of a first application or a first service and a response to the question was not received from the one or more recipients within a predetermined time;

monitoring a digital location of the sender and the one or more recipients, the digital location being an electronic application or service that is currently utilized and usable for resurfacing the question, wherein monitoring the digital location of the sender and the one or more recipients includes receiving over the network a presence update for each of the sender and the one or more recipients indicating a change in the sender's or the one or more recipients' use of the electronic application or service;

determining whether the sender and at least one of the one or more recipients are concurrently using a second application or a second service; and upon determining that the sender and the at least one of the one or more recipients are concurrently using the second application or the second service, sending a notification signal over the network to the sender or the at least one of the one or more recipients to notify the sender or the at least one of the one or more recipients via a user interface element displayed on a client device that the sender and at least one of the one or more recipients are available within the second application or the second service, wherein the notification signal includes a reminder about the question.

2. The data processing system of claim 1, wherein, for monitoring the digital location of the sender and the one or more recipients, the executable instructions, when executed by the processor, further cause the data processing system to perform a function of:

examining the presence update for each of the sender and the one or more recipients to determine if there is an overlap between the sender's and at least one of the one or more recipients' use of the application or service.

3. The data processing system of claim 2, wherein the application is at least one of an instant messaging application, a conferencing application, a voicemail application, an email application, and a document editing application where a document being edited has been shared between the sender and at least one of the one or more recipients.

4. The data processing system of claim 1, wherein, for monitoring the digital location of the sender and the one or more recipients, the executable instructions, when executed by the processor, further cause the data processing system to perform a function of monitoring a physical location of the sender and at least one of the one or more recipients.

5. The data processing system of claim 4, wherein, for monitoring the physical location of the sender and the one or more recipients, the executable instructions, when executed by the processor, further cause the data processing system to perform a function of monitoring a digital calendar to determine if the sender and at least one of the one or more recipients are within a predetermined physical distance from each other.

6. The data processing system of claim 1, wherein the executable instructions, when executed by the processor, further cause the data processing system to perform a function of determining if the message includes the question by analyzing contents of the message to determine if the contents include a punctuation mark corresponding with a question.

7. The data processing system of claim 1, wherein the executable instructions, when executed by the processor, further cause the data processing system to perform a function of determining if the message includes the question by analyzing contents of the message by performing natural language analysis of the contents to determine if the contents correspond with a question.

8. The data processing system of claim 1, wherein the executable instructions, when executed by the processor, further cause the data processing system to perform a function of determining if the response to the question was not received from the one or more recipients within a predetermined time by performing a function of monitoring exchange of messages between the sender and the recipient via the first application or the first service to determine if a recipient-initiated message is sent from one of the one or more recipients to the sender within the predetermined time.

9. The data processing system of claim 1, wherein the executable instructions, when executed by the processor, further cause the data processing system to perform a function of:

upon sending the notification signal over the network, discontinuing the monitoring of the digital location of the sender and the one or more recipients.

10. A method for enabling synchronous communications between a sender and one or more recipients of a message containing a question, the method comprising:

receiving over a network an indication that the message was sent from the sender to the one or more recipients via a user interface of a first application or a first service and a response to the question was not received from the one or more recipients within a predetermined time;

monitoring a digital location of the sender and the one or more recipients, the digital location being an electronic application or service that is currently utilized and usable for resurfacing the question, wherein monitoring the digital location of the sender and the one or more recipients includes receiving over the network a presence update for each of the sender and the one or more recipients indicating a change in the sender's or the one or more recipients' use of the electronic application or service;

determining whether the sender and at least one of the one or more recipients are concurrently using a second application or a second service; and upon determining that the sender and the at least one of the one or more recipients are concurrently using the second application or the second service, sending a notification signal over the network to the sender or the at least one of the one or more recipients to notify the sender or the at least one of the one or more recipients via a user interface element displayed on a client device that the sender and at least one of the one or more recipients are available within the second application or the second service, wherein the notification signal includes a reminder about the question.

11. The method of claim 10, wherein monitoring the digital location of the sender and the one or more recipients further includes:

examining the presence update for each of the sender and the one or more recipients to determine if there is an overlap between the sender's and at least one of the one or more recipients' use of the application or service.

12. The method of claim 10, wherein the application is at least one of an instant messaging application, a conferencing application, a voicemail application, an email application, and a document editing application where a document being edited has been shared between the sender and at least one of the one or more recipients.

13. The method of claim 10, further comprising determining if the message includes the question by analyzing contents of the message to determine if the contents include a punctuation mark corresponding with a question.

14. The method of claim 10, further comprising determining if the message includes the question comprises analyzing contents of the message by performing natural language analysis of the contents to determine if the contents correspond with a question.

15. The method of claim 10, further comprising upon sending the notification signal over the network, discontinuing the monitoring of the digital location of the sender and the one or more recipients.

16. A non-transitory computer readable medium on which are stored instructions that when executed cause a programmable device to perform:
   receiving over a network an indication that a message containing a question was sent from a sender to one or more recipients via a user interface of a first application or a first service and a response to the question was not received from the one or more recipients within a predetermined time;
   monitoring a digital location of the sender and the one or more recipients, the digital location being an electronic application or service that is currently utilized and usable for resurfacing the question, wherein monitoring the digital location of the sender and the one or more recipients includes receiving over the network a presence update for each of the sender and the one or more recipients indicating a change in the sender's or the one or more recipients' use of the electronic application or service;
   determining whether the sender and at least one of the one or more recipients are concurrently using a second application or a second service; and
   upon determining that the sender and the at least one of the one or more recipients are concurrently using the second application or the second service, sending a notification signal over the network to the sender or the at least one of the one or more recipients to notify the sender or the at least one of the one or more recipients via a user interface element displayed on a client device that the sender and at least one of the one or more recipients are available within the second application or the second service,
   wherein the notification signal includes a reminder about the question.

17. The non-transitory computer readable medium of claim 16, wherein, for monitoring the digital location of the sender and the one or more recipients, the instructions, when executed, further cause the programmable device to perform:
   examining the presence update for each of the sender and the one or more recipients to determine if there is an overlap between the sender's and at least one of the one or more recipients' use of the application or service.

18. The non-transitory computer readable medium of claim 16, wherein the application is at least one of an instant messaging application, a conferencing application, a voice-mail application, an email application, and a document editing application where a document being edited has been shared between the sender and at least one of the one or more recipients.

19. The non-transitory computer readable medium of claim 16, wherein the instructions, when executed, further cause the programmable device to perform determining if the message includes the question comprises analyzing contents of the message by performing natural language analysis of the contents to determine if the contents correspond with a question.

20. The non-transitory computer readable medium of claim 16, wherein the instructions, when executed, further cause the programmable device to perform, upon sending the notification signal over the network, discontinuing the monitoring of the digital location of the sender and the one or more recipients.

* * * * *